(12) United States Patent
Swaminathan et al.

(10) Patent No.: US 9,148,852 B2
(45) Date of Patent: Sep. 29, 2015

(54) METHOD AND APPARATUS FOR CONTROLLING RECEIVE DIVERSITY ON A WIRELESS DEVICE

(71) Applicant: QUALCOMM Incorporated, San Diego, CA (US)

(72) Inventors: Arvind Swaminathan, San Diego, CA (US); Nitin Kasturi, Saratoga, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 164 days.

(21) Appl. No.: 13/795,595

(22) Filed: Mar. 12, 2013

(65) Prior Publication Data

US 2014/0273866 A1 Sep. 18, 2014

(51) Int. Cl.
*H04B 1/02* (2006.01)
*H04B 7/02* (2006.01)
*H03C 7/02* (2006.01)
*H04W 52/02* (2009.01)
(Continued)

(52) U.S. Cl.
CPC ......... *H04W 52/0209* (2013.01); *H04B 7/0871* (2013.01); *H04B 7/0877* (2013.01); *H04L 1/0021* (2013.01); *H04L 1/0036* (2013.01); *H04L 1/06* (2013.01)

(58) Field of Classification Search
CPC .. H04W 52/0209; H04W 52/02; H04B 7/082; H04B 7/0817; H04B 7/0874; H04B 7/08; H04B 1/06; H04B 7/00; H04M 1/00
USPC ........... 455/101, 67.13, 67.11, 132–136, 522, 455/275, 277.1, 277.2, 63.1, 272, 303, 273; 375/219, 347, 226, 241; 370/342, 320, 370/335
See application file for complete search history.

(56) References Cited

U.S. PATENT DOCUMENTS 7,925,302 B2 * 4/2011 Ulupinar et al. ........... 455/562.1
7,929,921 B2 4/2011 Love et al.
(Continued)

FOREIGN PATENT DOCUMENTS

WO WO-2005084379 A2 9/2005
WO WO-2009105352 A1 8/2009

OTHER PUBLICATIONS

International Search Report and Written Opinion—PCT/US2014/022035—ISA/EPO—May 20, 2014.

*Primary Examiner* — Pablo Tran
(74) *Attorney, Agent, or Firm* — Patterson & Sheridan, L.L.P.

(57) ABSTRACT

Techniques for controlling receive diversity on a wireless device are disclosed. In one aspect, one or more thresholds are determined based on one or more parameters. One or more other parameters are compared against the one or more thresholds to determine whether to enable or disable receive diversity. For example, a wireless device may determine a threshold value based on a first parameter related to communication of the wireless device. The wireless device may decide to enable or disable receive diversity based on a second parameter and the threshold value. The wireless device may receive data transmission with receive diversity when a decision is made to enable receive diversity. The first parameter may relate to characteristics of data being received by the wireless device and may be represented by percentage downlink utilization. The second parameter may relate to channel conditions and may be represented by an improvement in received signal quality with receive diversity enabled.

25 Claims, 6 Drawing Sheets

(51) Int. Cl.
*H04B 7/08* (2006.01)
*H04L 1/00* (2006.01)
*H04L 1/06* (2006.01)

(56) References Cited

U.S. PATENT DOCUMENTS

| | | | |
|---|---|---|---|
| 8,031,622 B2 | 10/2011 | Padovani et al. | |
| 8,086,195 B2 * | 12/2011 | Thomas et al. | 455/132 |
| 8,160,648 B2 | 4/2012 | Ulupinar et al. | |
| 8,538,472 B2 * | 9/2013 | Dawid et al. | 455/522 |
| 8,626,109 B2 * | 1/2014 | Ma et al. | 455/343.2 |
| 8,682,256 B2 * | 3/2014 | Zimmermann et al. | 455/67.11 |
| 8,711,827 B2 * | 4/2014 | Murata et al. | 370/342 |
| 2008/0051046 A1 * | 2/2008 | Ruckriem | 455/132 |
| 2008/0220819 A1 * | 9/2008 | Ben-Eli | 455/561 |
| 2008/0259893 A1 | 10/2008 | Murata et al. | |
| 2012/0149424 A1 | 6/2012 | Dawid et al. | |
| 2012/0219040 A1 | 8/2012 | Valentine et al. | |

* cited by examiner

METHOD AND APPARATUS FOR CONTROLLING RECEIVE DIVERSITY ON A WIRELESS DEVICE

BACKGROUND

I. Field

The present disclosure relates generally to communication, and more specifically to techniques for controlling operation of a wireless device in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless device may utilize multiple receive antennas for data reception to obtain diversity against deleterious path effects. At least one propagation path typically exists between each transmit antenna at a base station and each receive antenna at the wireless device. If the propagation paths for different transmit-receive antenna pairs are independent, which is generally true to at least an extent, then diversity increases and the received signal quality at the wireless device improves when multiple antennas are used to receive data transmission from the base station.

The wireless device may include various circuits to process one or more received signals from one or more receive antennas. These circuits consume battery power when operational. It is desirable to obtain the benefits of receive diversity while reducing power consumption by these circuits in order to extend battery life of the wireless device.

SUMMARY

Techniques for controlling receive diversity on a wireless device are disclosed herein. In an aspect of the present disclosure, receive diversity may be enabled or disabled based on multiple parameters such that good performance can be achieved. In one example, one or more thresholds may be determined based on one or more parameters. One or more other parameters may be compared against the one or more thresholds to determine whether to enable or disable receive diversity. This scheme may result in receive diversity being enabled in more operating scenarios when the benefits of improved performance with receive diversity outweigh the cost of higher power consumption due to receive diversity.

In one example, a wireless device may determine a threshold value based on a first parameter related to communication of the wireless device. The wireless device may decide to enable or disable receive diversity based on a second parameter and the threshold value. The wireless device may receive data transmission with receive diversity when a decision is made to enable receive diversity.

In one example, the first parameter may relate to characteristics of data being received by the wireless device. The first parameter may be represented by percentage downlink utilization, which may be indicative of a percentage of time in which data is sent to the wireless device. In one example, the second parameter may relate to channel conditions observed by the wireless device. The second parameter may be represented by an improvement in received signal quality at the wireless device with receive diversity enabled. For example, the wireless device may determine the threshold value based on the percentage downlink utilization. The threshold value may be indicative of a minimum improvement in received signal quality required to enable receive diversity. The wireless device may enable receive diversity if the improvement in received signal quality exceeds the threshold value and may disable receive diversity otherwise.

Various aspects and features of the disclosure are described in further detail below.

DETAILED DESCRIPTION

The techniques described herein to control receive diversity (RxD) on a wireless device may be used for various wireless communication systems and standards. The terms "system" and "network" are often used interchangeably. For example, the techniques may be used for CDMA, TDMA, FDMA, OFDMA, SC-FDMA, and other systems. Different wireless systems may implement different radio access technologies. For example, a CDMA system may implement a radio access technology such as Universal Terrestrial Radio Access (UTRA), cdma2000, etc. UTRA includes Wideband CDMA (WCDMA), Low Chip Rate (LCR), and other variants of CDMA. cdma2000 includes IS-2000, IS-95 and IS-856 standards. A TDMA system may implement a radio access technology such as Global System for Mobile Communications (GSM). An OFDMA system may implement a radio access technology such as Evolved UTRA (E-UTRA), Ultra Mobile Broadband (UMB), IEEE 802.11 (Wi-Fi), IEEE 802.16 (WiMAX), IEEE 802.20, Flash-OFDMO, etc. UTRA, E-UTRA and GSM are part of Universal Mobile Telecommunication System (UMTS). 3GPP Long Term Evolution (LTE) and LTE-Advanced (LTE-A) are recent releases of UMTS that use E-UTRA. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless systems and radio access technologies mentioned above as well as other wireless systems and radio access technologies. For example, the techniques may be used to receive signals from broadcast systems, satellite positioning systems, etc.

Figure 1:
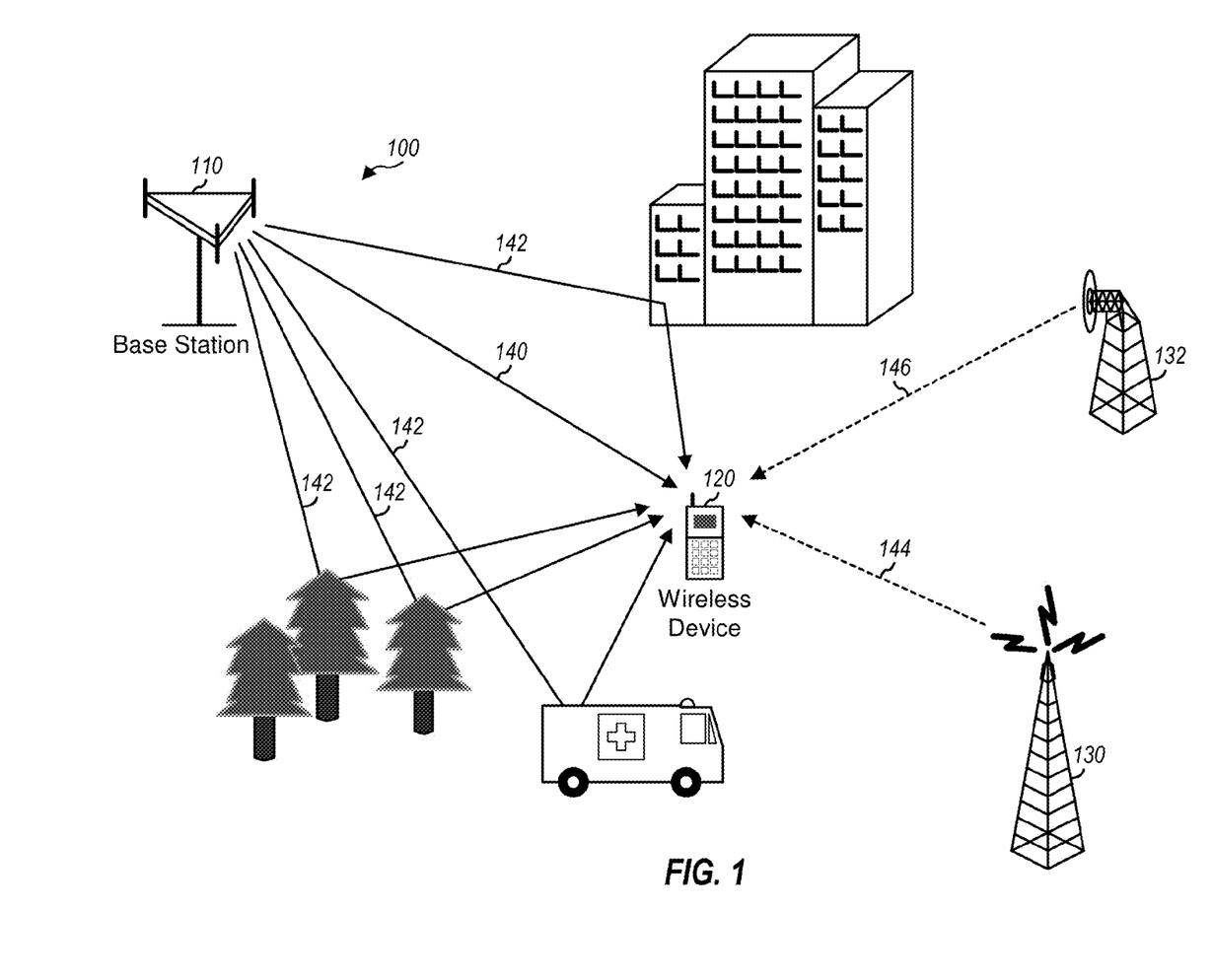
FIG. 1 shows an exemplary transmission in a wireless communication system.

FIG. 1 shows an example transmission in a wireless communication system 100. For simplicity, FIG. 1 shows wireless system 100 including one base station 110 communicating with one wireless device 120. In general, wireless system 100 may include a number of base stations and other network entities. A base station may be an entity that communicates with wireless devices and may also be referred to as a Node B, an evolved Node B (eNode B), an access point, etc.

Wireless device 120 may be stationary or mobile and may also be referred to as a user equipment (UE), a mobile station, a terminal, an access terminal, a subscriber unit, a station, etc. Wireless device 120 may be a cellular phone, a smartphone, a tablet, a wireless communication device, a personal digital assistant (PDA), a wireless modem, a handheld device, a laptop computer, a cordless phone, a wireless local loop (WLL) station, a netbook, a smartbook, etc.

Base station 110 may transmit a downlink signal to wireless device 120 and/or other wireless devices. The downlink signal may reach wireless device 120 via one or more signal paths, which may include a direct path 140 and/or reflected paths 142. Reflected paths 142 are created by reflections of radio waves due to obstructions (e.g., buildings, trees, vehicles, and other structures) in a wireless environment. Wireless device 120 may receive multiple instances or copies of the transmitted downlink signal. Each received downlink signal instance is obtained via a different signal path and has a particular complex gain and a particular propagation delay determined by that signal path. A received radio frequency (RF) signal at wireless device 120 includes a superposition of all received downlink signal instances at the wireless device. Wireless device 120 may also receive interfering transmissions from other transmitting stations 130 and 132. The interfering transmissions are shown by dashed lines 144 and 146 in FIG. 1.

Figure 2:
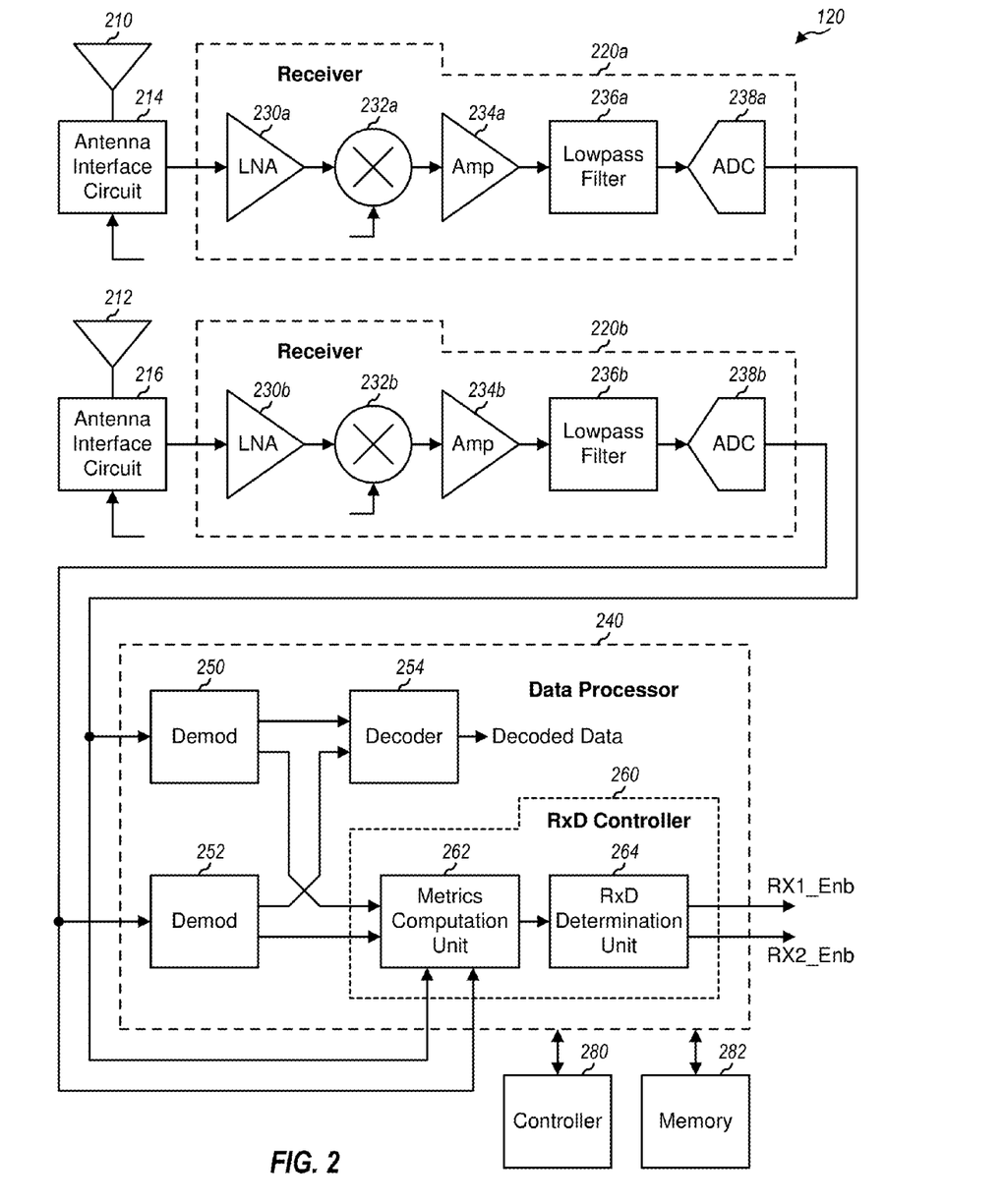
FIG. 2 shows an exemplary functional block diagram of a wireless device.

FIG. 2 shows an exemplary functional block diagram of wireless device 120 in FIG. 1. In this example, wireless device 120 includes two antennas 210 and 212 that may be used for data reception. Antenna 210 may be designated as a primary or main antenna, and antenna 212 may be designated as a diversity or secondary antenna. Antennas 210 and 212 may be implemented with the same antenna design or different antenna designs.

In the example shown in FIG. 2, wireless device 110 includes two antenna interface circuits 214 and 216 and two receivers 220 and 222 for the two antennas 210 and 212, a data processor 240, a controller 280, and a memory 282. Receiver 220 has its input coupled to primary antenna 210 via antenna interface circuit 214 and its output coupled to data processor 240. Receiver 222 has its input coupled to diversity antenna 212 via antenna interface circuit 216 and its output coupled to data processor 240.

In the example shown in FIG. 2, receiver 220 includes a low noise amplifier (LNA) 230a, a downconverter 232a, an amplifier (Amp) 234a, a lowpass filter 236a, and an analog-to-digital converter (ADC) 238a. Antenna 210 receives signals from base stations and/or other transmitter stations and provides a first received RF signal, which is routed through antenna interface circuit 214 and provided to receiver 220. Within receiver 220, the first received RF signal is amplified by LNA 230a, downconverted by downconverter 232a, amplified by amplifier 234a, filtered by filter 236a, and digitized by ADC 238a to obtain first input samples, which are provided to data processor 240.

Similarly, receiver 222 includes an LNA 230b, a downconverter 232b, an amplifier 234b, a filter 236b, and an ADC 238b. Antenna 212 receives signals from base stations and/or other transmitter stations and provides a second received RF signal, which is routed through antenna interface circuit 216 and provided to receiver 222. Within receiver 222, the second received RE signal is amplified by LNA 230b, downconverted by downconverter 232b, amplified by amplifier 234b, filtered by filter 236b, and digitized by ADC 238b to obtain second input samples, which are provided to data processor 240.

FIG. 2 shows an exemplary functional block diagram of receivers 220 and 222. Receivers 220 and 222 may each include different and/or other circuits not shown in FIG. 2. In general, a receiver may include various circuits such as amplifiers, mixers, filters, ADCs, etc. Receivers 220 and 222 may have the same or different circuit designs. For example, receiver 220 may be designed to meet all applicable receiver requirements even in worst-case conditions. Receiver 222 may be designed to operate with lower current and to meet the receiver requirements in most (but not necessarily worst-case) conditions. All or a portion of receivers 220 and 222 may be implemented on one or more analog integrated circuits (ICs), RF ICs (RFICs), mixed-signal ICs, etc.

In the example shown in FIG. 2, data processor 240 includes demodulators (Demod) 250 and 252 for the two antennas 210 and 212 and a decoder 254. Demodulator 250 may demodulate the first input samples from receiver 220 based on a radio access technology utilized by wireless system 100 and provide first demodulated symbols. Demodulator 252 may demodulate the second input samples from receiver 222 based on the radio access technology utilized by wireless system 100 and provide second demodulated symbols. Decoder 254 may decode the first and/or second demodulated symbols to obtain decoded data.

In the example shown in FIG. 2, data processor 240 further includes a receive diversity (RxD) controller 260, which includes a metrics computation unit 262 and a receive diversity determination unit 264. Unit 262 may receive the first and second input samples from receivers 220 and 222 and/or the first and second demodulated symbols from demodulators 250 and 252. Unit 262 may compute one or more metrics, which may be used to enable or disable receive diversity at wireless device 120. Unit 264 may receive the metric(s) from unit 262 and possibly other information that may be used to enable or disable receive diversity. Unit 264 may determine whether to enable or disable receive diversity at wireless device 120 based on the received metric(s) and possibly other information. Unit 264 may then determine whether to enable receiver 220 and/or 222 based on the decision to enable or disable receive diversity. Unit 264 may provide (i) an RX1_Enb control signal to enable receiver 220 for primary antenna 210 and/or (ii) an RX2_Enb control signal to enable receiver 222 for diversity antenna 210. Unit 264 may enable only receiver 220 or only receiver 222 when receive diversity is disabled. Unit 264 may enable both receivers 220 and 222 when receive diversity is enabled.

For simplicity, only the receiver portion of wireless device 120 is shown in FIG. 2. Wireless device 120 may also include one or more transmitters, encoders, modulators, etc. for data transmission.

Controller 280 may control the operation of various units in wireless device 120. For example, controller 280 may control the processing of data being received via receivers 220 and 222 and data being transmitted. Controller 280 may also control the operation of receive diversity controller 260. A memory 282 may store program codes and data for data processor 240 and controller 280. Data processor 240, controller 280, and memory 282 may be implemented on one or more application specific integrated circuits (ASICs) and/or other ICs.

FIG. 2 shows an exemplary functional block diagram of a wireless device. The antenna interface circuits, receivers, data processor, controller, and memory in FIG. 2 may be implemented in various manners. For example, a wireless device may include an ASIC, one or more memories coupled to the ASIC, and one or more RFICs coupled to the ASIC. The ASIC may include a digital signal processor (DSP), an advanced RISC machine (ARM) processor, a central processing unit (CPU), and/or one or more other processors. Data processor 240, controller 280, and memory 282 may be implemented by the DSP, the ARM processor, and/or the CPU within the ASIC. Receiver 220 and 222 may be implemented by the RFIC(s). A wireless device may also include different and/or other processors, controllers, and circuits not shown in FIG. 2. The processors, controllers, and circuits of a wireless device may also be implemented in other manners different from the example described above.

Wireless device 120 may receive downlink transmissions using (i) only primary antenna 210 without receive diversity or (ii) both primary antenna 210 and diversity antenna 212 with receive diversity. With receive diversity, received signals from the two antennas 210 and 212 may be processed and combined to obtain a higher signal-to-noise-and-interference ratio (SINR) for a received transmission at wireless device 120.

Receive diversity may provide various advantages. First, a higher SINR provided by receive diversity may enable wireless device 120 to receive data at a higher rate, which may result in better user experience. Second, receive diversity may enable wireless device 120 to receive a given amount of data in a shorter amount of time, which may enable wireless device 120 to go back to a dormant state earlier. For certain channel conditions, receive diversity may result in lower current/power consumed per kilobyte (KB) of data transferred. Third, receive diversity may enable wireless system 100 to serve more users and improve system performance and capacity. However, receive diversity typically consumes more battery power of wireless device 120. Hence, receive diversity may be enabled when beneficial (e.g., when performance gains outweigh current consumption) and may be disabled otherwise.

In an aspect of the present disclosure, receive diversity may be enabled or disabled based on multiple parameters such that good performance can be achieved. In particular, a decision to enable or disable receive diversity may be made based on one or more parameters and one or more thresholds, with the one or more thresholds being determined based on one or more other parameters. This scheme may result in receive diversity being enabled in more operating scenarios when the benefits of improved performance with receive diversity outweigh the cost of higher battery power consumption due to receive diversity.

Various parameters may be used to enable or disable receive diversity. The parameters may be quantified by one or more metrics, which may be compared against one or more thresholds to determine whether to enable or disable receive diversity. In one example, receive diversity may be enabled or disabled based on one or more of the following parameters:
  Channel conditions,
  Data characteristics,
  Radio link failure (RLF) conditions, and
  Other parameters.

Channel conditions may be characterized by different channel profiles such as:
  ITU Pedestrian A Speed 3 kilometers/hour (km/h) (PA3),
  ITU Pedestrian B Speed 3 km/h (PB3),
  ITU vehicular A Speed 30 km/h (VA30), and
  ITU vehicular A Speed 120 km/h (VA 120).

The channel profiles listed above are described in a document 3GPP TR 25.890, entitled "High Speed Downlink Packet Access: UE Radio Transmission and Reception (FDD)," which is publicly available. Each channel profile may be associated with a particular user speed, a set of relative channel delay spreads, and a particular average power for each of the set of relative channel delay spreads. For clarity, some of the description below refers to the four channel profiles described above. However, the techniques disclosed herein may be used for various channel profiles and conditions, which may be generically referred to as low mobility channel profiles/conditions and high mobility channel profiles/conditions.

Channel conditions may be quantified by an improvement in SINR with receive diversity enabled versus SINR without receive diversity. Different channel profiles may be associated with different amounts of improvement in SINR with receive diversity. Receive diversity may provide greater improvement in SINR in some channel conditions and smaller improvement in SINR in some other channel conditions. For example, PB3 channel profile (e.g., at 0 dB SINR) may be associated with a large improvement in SINR with receive diversity. Conversely, VA120 (e.g., at 10 dB SINR) may be associated with a small improvement in SINR with receive diversity. PB3 (at 0 dB) and VA120 (at 10 dB) may represent two extremes in channel conditions in terms of improvement in SINR with receive diversity enabled.

Channel conditions may also be quantified or represented by other metrics instead of SINR improvement. For example, channel conditions may be quantified by an improvement in spectral efficiency, a block error rate (BLER), an error rate at a link layer such as a Radio Link Layer (RLC), etc.

Data characteristics refer to characteristics of data being received by wireless device 120. For example, wireless device 120 may have one or more traffic flows that are active, and each traffic flow may have certain characteristics. Data characteristics may be modeled by different traffic scenarios such as:
  File Transfer Protocol (FTP) downloading—sustained high data activity,
  Video/audio download—medium data activity with periods of data bursts mixed with periods of inactivity or low activity,
  Browser—small bursts of data, and
  Email—low data activity.

FTP traffic may include downloading of files and/or other content and may be characterized by sustained high data activity or traffic. Video/audio download traffic may include downloading of selected video and/or audio content and may be characterized by periods of high data activity mixed with periods of low or no data activity. Browser traffic may include sporadic downloading of web content and may be characterized by bursts of data activity mixed with periods of low or no data activity. For example, a typical browsing session may include a series of web page downloads interspersed with reading periods. Email traffic may include downloading of emails and may be characterized by low data activity on average. The four traffic scenarios listed above represent a range of data activity—from sustained high data activity for FTP traffic to very low data activity for email traffic.

In one example, data characteristics may be quantified by a percentage downlink utilization (or % DL utilization). Percentage downlink utilization may be indicative of a percentage of time that a wireless device receives data on the downlink. Percentage downlink utilization may range from 0% to 100% and may be progressively higher for progressively higher data activity or traffic. For example. percentage downlink utilization may be low for email traffic, higher for browser traffic, even higher for video/audio download traffic, and highest for FTP traffic.

Data characteristics may also be quantified by other metrics instead of percentage downlink utilization. For example, data characteristics may be quantified by throughput, or average data rate, or decode success rate, etc.

Radio link failure conditions may be indicative of approaching radio link failure of wireless device 120. Approaching radio link failure may be detected in various manners and based on various parameters such as BLER, number of retransmissions of protocol data units (PDUs) at RLC, etc. For example, approaching radio link failure may be declared if there is a sudden jump in BLER, or if there is a large number of PDU retransmissions, etc.

Receive diversity may be enabled or disabled based on a set of parameters in various manners. In one example, an initial decision to enable or disable receive diversity may be made independently for each parameter being considered. A final decision to enable or disable receive diversity may then be made based on the initial decisions for all parameters being considered.

Figure 3:
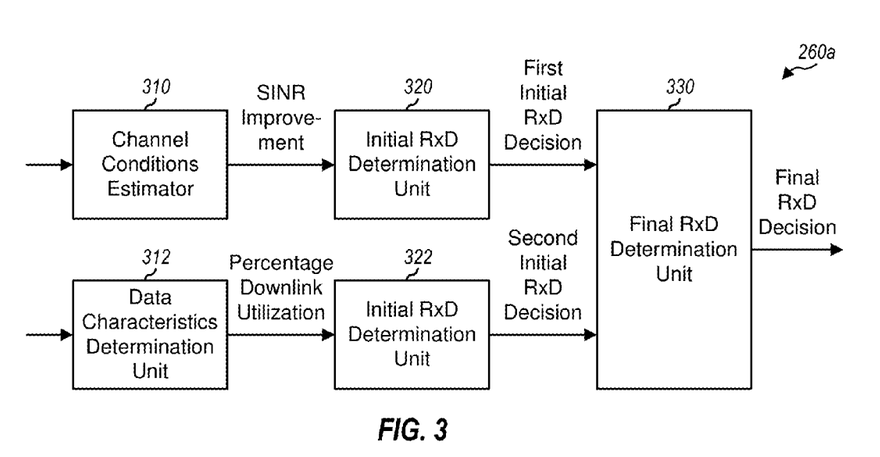
FIGS. 3, 4 and 6 show three exemplary functional block diagrams of a receive diversity (RxD) controller.

FIG. 3 shows a functional block diagram of a receive diversity controller 260*a*, which is one example of receive diversity controller 260 in FIG. 2. Receive diversity controller 260*a* controls receive diversity based on independent consideration of channel conditions and data characteristics. In the example shown in FIG. 3, receive diversity controller 260*a* includes a channel conditions estimator 310, a data characteristics determination unit 312, and receive diversity determination units 320, 322 and 330. Units 310 and 312 may be part of metrics computation unit 262 in FIG. 2. Units 320, 322 and 330 may be part of receive diversity determination unit 264 in FIG. 2.

Channel conditions estimator 310 may estimate SINR without receive diversity, estimate SINR with receive diversity, and determine the amount of improvement in SINR with receive diversity. Estimator 310 may estimate SINR for a base station based on a pilot or a reference signal included in a downlink signal transmitted by the base station. Unit 320 may compare the SINR improvement against a first threshold value, provide a decision to enable receive diversity if the SINR improvement exceeds the first threshold value, and provide a decision to disable receive diversity if the SINR improvement is below the first threshold value. Unit 320 may thus provide a first initial decision to enable or disable receive diversity based solely on channel conditions or SINR improvement.

Unit 312 may determine data characteristics and provide percentage downlink utilization. Unit 322 may compare the percentage downlink utilization against a second threshold value, provide a decision to enable receive diversity if the percentage downlink utilization exceeds the second threshold value, and provide a decision to disable receive diversity if the percentage downlink utilization is below the second threshold value. Unit 322 may thus provide a second initial decision to enable or disable receive diversity based solely on data characteristics or percentage downlink utilization.

Unit 330 may receive the first and second initial decisions to enable or disable receive diversity from units 320 and 322, respectively. Unit 330 may determine a final decision to enable or disable receive diversity based on the first and second initial decisions. For example, unit 330 may apply a logical AND rule and may provide (i) a final decision to enable receive diversity if all initial decisions are to enable receive diversity or (ii) a final decision to disable receive diversity if any initial decision is to disable receive diversity. Alternatively, unit 330 may apply a logical OR rule and may provide (i) a final decision to enable receive diversity if any initial decision is to enable receive diversity or (ii) a final decision to disable receive diversity if all initial decisions are to disable receive diversity. Unit 330 may also determine the final decision to enable or disable receive diversity based on the initial decisions in other manners, e.g., based on other rules.

Computer simulation was performed to evaluate the performance of the scheme shown in FIG. 3. Eight operating scenarios corresponding to different combinations of two channel profiles of PB3 (0 dB) and VA120 (10 dB) and four traffic scenarios of FTP, video/audio download, browser, and email traffics were evaluated. For each operating scenario, the amount of time that a wireless device is active (or in a Dedicated Channel (DCH) state) is determined for three cases—a first case with receive diversity always disabled, a second case with receive diversity always enabled, and a third case with receive diversity enabled or disabled based on the scheme shown in FIG. 3.

A cost may be determined for each case in each operating scenario as follows:

$$C_{i,k}=T_{i,k}*I_{i,k}, \qquad\qquad\qquad\qquad\qquad \text{Eq (1)}$$

where $T_{i,k}$ is an amount of time that a wireless device is active for the i-th case in the k-th operating scenario, $I_{i,k}$ is an amount of current consumed by the wireless device for the i-th case in the k-th operating scenario, and $C_{i,k}$ is a cost for the i-th case in the k-th operating scenario.

In equation (1), the cost is a product of the active time and the consumed current during the active time. The cost is indicative of the amount of battery power consumed by the wireless device for data reception, and a lower cost is desirable. Computer simulation indicates that enabling receive diversity results in a lower cost for all traffic scenarios (FTP, video/audio download, browser, and email traffics) in PB3 (0 dB) channel conditions. Computer simulation also indicates that enabling receive diversity reduces the cost only for FTP traffic and increases the cost for the other three traffic scenarios in VA120 (10 dB) channel conditions.

Receive diversity may be enabled or disabled based on channel conditions and data characteristics independently, e.g., as shown in FIG. 3. In this case, unit 320 may output an initial decision to (i) enable receive diversity in PB3 (0 dB) channel conditions and (ii) disable receive diversity in VA120 (10 dB) channel conditions. Unit 322 may output an initial decision to (i) enable receive diversity for FTP, video/audio download, and browser traffics and (ii) disable receive diversity for email traffic. Unit 330 may output a final decision to (i) enable receive diversity for FTP, video/audio download, and browser traffics in PB3 (0 dB) channel conditions and (ii) disable receive diversity for all other operating scenarios. The final decision may result in a higher cost in some operating scenarios. For example, unit 330 may make a final decision to disable receive diversity in VA120 (10 dB) channel conditions. However, this would result in a higher cost for FTP traffic in VA120 (10 dB) channel conditions. The description above may also be applied to any set of channel profiles/conditions such as low mobility channel profiles/conditions and high mobility channel profiles/conditions.

Improved performance may be obtained by making a decision to enable or disable receive diversity by jointly considering multiple parameters such as channel conditions and data characteristics. For example, at least one parameter may be used to determine at least one threshold value for at least one other parameter. A decision to enable or disable receive diversity may then be made based on the at least one other parameter and the at least one threshold value. For example, a threshold value may be determined based on data characteristics. A decision to enable or disable receive diversity may then be made based on channel conditions and the threshold value. Receive diversity may be more aggressively enabled for a sustained data transfer such as FTP traffic and less aggressively enabled for bursty data traffic such as video/audio download or browser traffic. Enabling or disabling receive diversity by jointly considering multiple parameters may result in improved performance.

Figure 4:
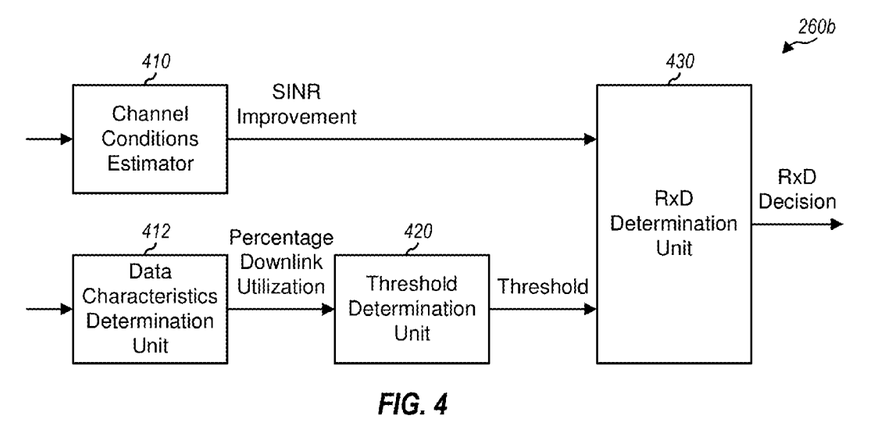

FIG. 4 shows a functional block diagram of a receive diversity controller 260b, which is another example of receive diversity controller 260 in FIG. 2. Receive diversity controller 260b controls receive diversity based on joint consideration of channel conditions and data characteristics. In the example shown in FIG. 4, receive diversity controller 260b includes a channel conditions estimator 410, a data characteristics determination unit 412, a threshold determination unit 420, and a receive diversity determination unit 430. Units 410 and 412 may be part of metrics computation unit 262 in FIG. 2. Units 420 and 430 may be part of receive diversity determination unit 264 in FIG. 2.

Within receive diversity controller 260b, channel conditions estimator 410 may estimate SINR without receive diversity, estimate SINR with receive diversity, and determine the amount of improvement in SINR with receive diversity. Unit 412 may determine data characteristics and provide percentage downlink utilization. In one example, unit 412 may determine the percentage of time that wireless device 120 is in an active state to receive downlink data transmission from a base station. For example, wireless device 120 may be either scheduled or not scheduled for data transmission in each transmission time interval (TTI), which may be 1 or 2 milliseconds (ms) or some other duration. Unit 412 may determine the percentage of time that wireless device 120 is in the active state (e.g., the number of TTIs in which wireless device 120 is scheduled) in each time period of a particular duration (e.g., 10, 20, 40 or 80 ms). Unit 412 may average the active percentage of time across different time periods to obtain the percentage downlink utilization. Unit 420 may receive the percentage downlink utilization from unit 412 and may determine a threshold value based on the percentage downlink utilization. In one example, a receive diversity selection function that provides threshold values versus percentage downlink utilization may be defined. Unit 420 may determine a threshold value corresponding to the percentage downlink utilization received from unit 412 and may provide this threshold value to unit 430.

Unit 430 may receive the threshold value from unit 420 and the SINR improvement from unit 410. Unit 430 may compare the SINR improvement against the threshold value and may determine whether or not to enable receive diversity based on the comparison result. In particular, unit 430 may provide a decision to (i) enable receive diversity if the SINR improvement is greater than the threshold value or (ii) disable receive diversity if the SINR improvement is less than the threshold value. Unit 430 may also decide to enable or disable receive diversity based on the SINR improvement and the threshold value in other manners.

The example in FIG. 4 allows receive diversity to be enabled or disabled based on a receive diversity selection function that may provide improved performance. For FTP traffic, percentage downlink utilization may be high (e.g., 80% or higher), and the receive diversity selection function may be biased towards enabling receive diversity even when the improvement in SINR may be low. For example, receive diversity may be enabled for FTP traffic when the SINR improvement is I dB or more.

For video/audio download traffic and other traffic of similar characteristics, percentage downlink utilization may be about 50% to 60%. The receive diversity selection function may enable receive diversity only when the SINR improvement is higher. For example, receive diversity may be enabled for video/audio download traffic when the SINR improvement is 2 dB or more.

In general, the receive diversity selection function may be defined to more readily enable receive diversity for traffics with progressively higher percentage downlink utilization. This may be achieved by progressively reducing the threshold value for progressively higher percentage downlink utilization. This would result in receive diversity being enabled with progressively smaller SINR improvement for traffics with progressively higher percentage downlink utilization. This may result in the benefits of receive diversity being realized for more operating scenarios.

Figure 5:
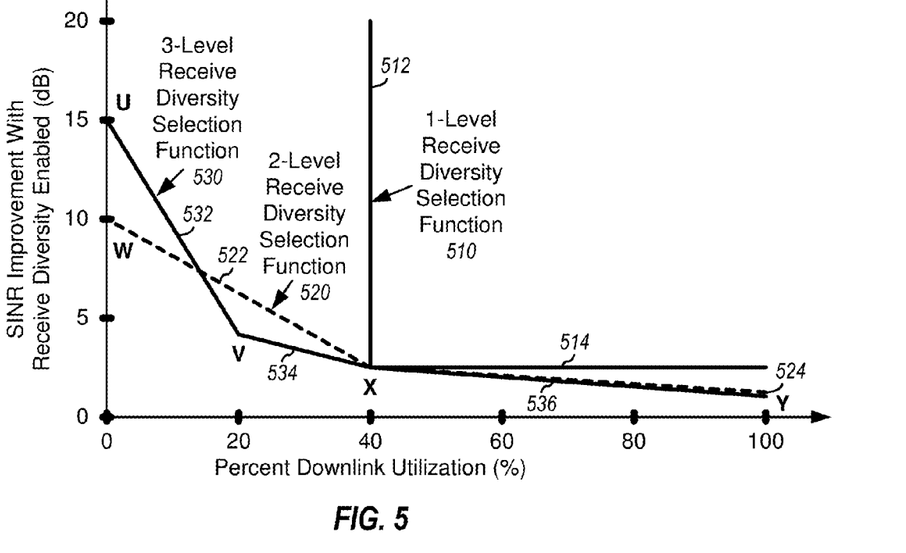
FIG. 5 shows three exemplary receive diversity selection functions.

FIG. 5 shows three exemplary receive diversity selection functions to enable or disable receive diversity based on two parameters for channel conditions and data characteristics. Channel conditions may be quantified by a metric for SINR improvement. Data characteristics may be quantified by a metric for percentage downlink utilization. In FIG. 5, the horizontal axis denotes percentage downlink utilization and ranges from 0% to 100%. The vertical axis denotes SINR improvement with receive diversity enabled and ranges from 0 to 20 dB. FIG. 5 shows three plots 510, 520 and 530 for three exemplary receive diversity selection functions. The plot for each receive diversity selection function defines threshold values as a function of percentage downlink utilization. A threshold value may be used for comparison against SINR improvement to determine whether to enable or disable receive diversity.

A 1-level receive diversity selection function 510 may be represented by a plot defined by a vertical line 512 and a horizontal line 514 intersecting at point X. Point X may be defined by a percentage downlink utilization of T % and an SINR improvement of Q dB. In one example, T may be equal to 40%, and Q may be equal to 1.5 dB. T and/or Q may also be equal to some other value. For the 1-level receive diversity selection function 510, receive diversity may be enabled when percentage downlink utilization is T % or more and SINR improvement meets or exceeds Q dB. The 1-level receive diversity selection function 510 may (i) enable receive diversity when the percentage downlink utilization and SINR improvement map to a point to the right of line 512 and above line 514 or (ii) disable receive diversity when percentage downlink utilization and SINK improvement map to a point to the left of line 512 and/or below line 514. The 1-level receive diversity selection function 510 may correspond to the scheme shown in FIG. 3 which enables or disables receive diversity independently for each of the two parameters for percentage downlink utilization and SINR improvement.

A 2-level receive diversity selection function 520 may be represented by a plot defined by two lines 522 and 524 of different slopes. Line 522 is from point W to point X, and line 524 is from point X to point Y. In one example, points W, X and Y may be defined as follows:

Point W: percentage downlink utilization=0%, SINR improvement=10 dB,
Point X: percentage downlink utilization=40%, SINR improvement=1.5 dB, and
Point Y: percentage downlink utilization=100%, SINR improvement=0.75 dB.

Points W, X and Y may each be defined by some other combination of values for percentage downlink utilization and SINR improvement. The 2-level receive diversity selection function 520 is defined by line 522 from point W to point X and line 524 from point X to point Y. Values of the 2-level receive diversity selection function 520 between points W, X and Y may be determined by linearly interpolation.

For the 2-level receive diversity selection function 520, receive diversity may be enabled when the percentage downlink utilization and SINR improvement map to a point above lines 522 and 524. Receive diversity may be disabled when the percentage downlink utilization and SINR improvement map to a point below lines 522 and 524.

A 3-level receive diversity selection function 530 may be represented by a plot defined by three lines 532, 534 and 536 of different slopes. Line 532 is from point U to point V, line 534 is from point V to point X, and line 536 is from point X to point Y. In one example, points U, V, X and Y may be defined as follows:

Point U: percentage downlink utilization=0%, SINR improvement=15 dB,

Point V: percentage downlink utilization=20%, SINR improvement=4 dB.

Point X: percentage downlink utilization=40%, SINR improvement=1.5 dB, and

Point Y: percentage downlink utilization=100%. SINR improvement=0.75 dB.

Points U, V, X and Y may each be defined by some other combination of values for percentage downlink utilization and SINR improvement. The 3-level receive diversity selection function 530 is defined by line 532 from point U to point V, line 534 from point V to point X, and line 536 from point X to point Y. Values of the 3-level receive diversity selection function 530 between points U, V, X and Y may be determined by linearly interpolation.

For the 3-level receive diversity selection function 530, receive diversity may be enabled when the percentage downlink utilization and SINR improvement map to a point above lines 532, 534 and 536. Receive diversity may be disabled when the percentage downlink utilization and SINR improvement map to a point below lines 532, 534 and 536.

The 2-level and 3-level receive diversity selection functions 520 and 530 jointly consider two parameters for percentage downlink utilization and SINR improvement. For a given percentage downlink utilization, receive diversity may be enabled if SINR improvement exceeds a threshold value corresponding to that percentage downlink utilization. Computer simulations indicate that the 2-level and 3-level receive diversity selection functions 520 and 530 provide better performance than the 1-level receive diversity selection function 510 in many operating scenarios.

FIG. 5 shows three exemplary receive diversity selection functions 510, 520 and 530 that may be used to enable or disable receive diversity. In general, a receive diversity selection function may include any number of levels and may be defined by any suitable plot. A plot for a receive diversity selection function may be defined with any number of lines of the same or different slopes. Each line may be defined by two points, and each point may be defined by any set of values for percentage downlink utilization and SINR improvement. More levels may allow for more aggressive use of receive diversity. For example, the 3-level receive diversity selection function 530 in FIG. 5 may allow for more aggressive use of receive diversity as reflected by lower threshold values) for percentage downlink utilization of 20 to 40% as compared to the 2-level receive diversity selection function 520.

A plot for a receive diversity selection function may define a variable threshold as a function of percentage downlink utilization. The variable threshold represents the minimum SINR improvement required to enable receive diversity. The variable threshold may be generally (i) smaller for higher percentage downlink utilization and (ii) larger for lower percentage downlink utilization. The variable threshold may be defined to provide good performance and may be determined based on computer simulation, empirical measurements, etc.

A receive diversity selection function may be defined in various manners. In one example, a receive diversity selection function may be defined to encourage selection of receive diversity for operating scenarios in which receive diversity is known or expected to improve performance. For example, performance of certain data traffic (e.g., email traffic) with a low percentage downlink utilization (e.g., approximately 20% or less) may be known or expected to be better in certain channel conditions (e.g., PB3 (0 dB)) with receive diversity enabled. An average improvement in SINR with receive diversity enabled may be determined for these channel conditions. A threshold value for a receive diversity selection function (e.g., the 3-level receive diversity selection function 530 shown in FIG. 5) at the low percentage downlink utilization (e.g., 20%) may be set to the average SINR improvement. The receive diversity selection function may then encourage selection of receive diversity for the PB3 (0 dB) at the low percentage downlink utilization. Other threshold values of the receive diversity selection function may be determined for other operating scenarios based on expected SINR improvement for these operating scenarios.

In another example, a receive diversity selection function may be defined to provide good performance for a set of values of percentage downlink utilization. For each percentage downlink utilization value, a cost with receive diversity enabled and a cost with receive diversity disabled may be determined for different possible channel conditions, which may include channel models with mobility and stationary channel for downtown, suburban, rural, etc. "Crossover" channel conditions for which better performance is obtained with receive diversity disabled may be determined. Improvement in SINR with receive diversity enabled for the crossover channel conditions may be determined. The receive diversity selection function may then include a threshold value for each percentage downlink utilization value, with the threshold value being set to the SINR improvement for the crossover channel conditions for that percentage downlink utilization value.

A receive diversity selection function may also be determined in other manners. A receive diversity selection function may be determined based on computer simulation and/or empirical measurements for different operating scenarios. A receive diversity selection function may be defined by any number of points, and other points in the function may be determined based on interpolation or some other means.

In one example, receive diversity may be disabled when a threshold value exceeds a high value of Z, which may be 8 dB or some other value. In this example, estimation of SINR improvement by unit 410 in FIG. 4 may be disabled, when the threshold value exceeds the high value, in order to conserve battery power. This example may be based on an assumption that there is no need to make SINR measurements when the cost function indicates that Z dB or greater of improvement in SINR is needed to enable receive diversity.

Receive diversity may also be enabled or disabled based on channel conditions, data characteristics, and radio link failure conditions. In one example, a threshold value may be determined based on data characteristics (e.g., percentage downlink utilization) and radio link failure conditions. Channel conditions (e.g., SINR improvement) may be compared against the threshold value to determine whether to enable or disable receive diversity.

Figure 6:
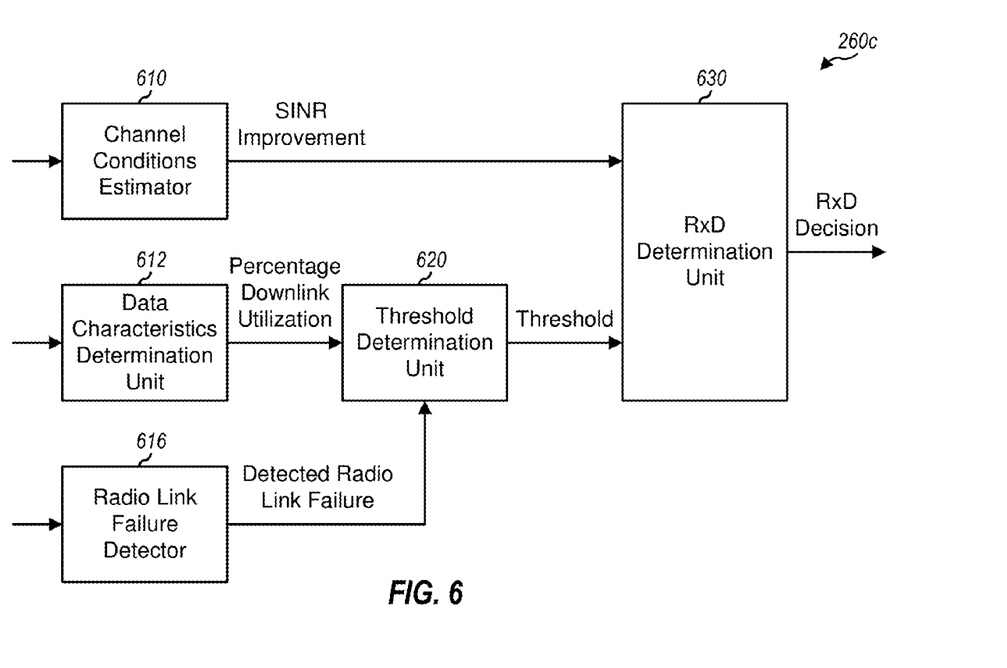

FIG. 6 shows a functional block diagram of a receive diversity controller 260e, which is yet another example of receive diversity controller 260 in FIG. 2. Receive diversity controller 260c controls receive diversity based on joint consideration of channel conditions, data characteristics, and radio link failure conditions. In the example shown in FIG. 6, receive diversity controller 260c includes a channel conditions estimator 610, a data characteristics determination unit 612, a radio link failure detector 614, a threshold determination unit 620, and a receive diversity determination unit 630. Units 610, 612 and 614 may be part of metrics computation unit 262 in FIG. 2. Units 620 and 630 may be part of receive diversity determination unit 264 in FIG. 2.

Within receive diversity controller 260c, channel conditions estimator 610 may estimate SINR without receive diversity, estimate SINR with receive diversity, and determine the amount of improvement in SINR with receive diversity. Unit 612 may determine data characteristics of wireless device 120 and provide percentage downlink utilization. Unit 614 may detect for radio link failure conditions and may provide an indication of detected radio link failure. For example, the indication may have (i) a first value (e.g., '1') if approaching radio link failure is detected or (ii) a second value (e.g., '0') if approaching radio link failure is not detected. Unit 620 may receive the percentage downlink utilization from unit 612 and the radio link failure indication from unit 614 and may determine a threshold value based on the received inputs.

A unit 630 may receive the threshold value from unit 620 and the SINR improvement from unit 610. Unit 630 may compare the SINR improvement against the threshold value and may determine whether or not to enable receive diversity based on the comparison result. In particular, unit 630 may provide a decision to (i) enable receive diversity if the SINR improvement is greater than the threshold value or (ii) to disable receive diversity if the SINR improvement is less than the threshold value. Unit 630 may also decide to enable or disable receive diversity based on the SINR improvement and the threshold value in other manners.

Unit 620 may determine the threshold value based on the percentage downlink utilization from unit 612 and the radio link failure indication from unit 614 in various manners. In one example, unit 612 may determine the threshold value based on (i) a first receive diversity selection function if radio link failure is not detected or (ii) a second receive diversity selection function if radio link failure is detected. The first receive diversity selection function may be any of the receive diversity selection functions shown in FIG. 5 or some other receive diversity selection function. The second receive diversity selection function may be associated with threshold values that are lower than those of the first receive diversity selection function in order to encourage selection of receive diversity when radio link failure is detected. For example, the second receive diversity selection function may be associated with a threshold value of 0.1 dB regardless of percentage downlink utilization. In general, the second receive diversity selection function may aggressively enable receive diversity when approaching radio link failure is detected and a call drop is likely.

In one example, receive diversity may be enabled or disabled based on one or more cost functions without hysteresis. In this example, a threshold value may be determined based on one or more parameters (e.g., data characteristics) and may be used for comparison by one or more other parameters (e.g., channel conditions).

In another example, receive diversity may be enabled or disabled based on one or more cost functions with hysteresis. In this example, a threshold value may be determined based on one or more parameters (e.g., data characteristics) as well as a current state of receive diversity. For example, receive diversity may be enabled if SINR improvement is greater than a first threshold value determined based on percentage downlink utilization. Receive diversity may thereafter be disabled if SINR improvement falls below a second threshold value for the same percentage downlink utilization. The second threshold value may be lower than the first threshold value, with the difference between the first and second threshold values corresponding to the amount of hysteresis. Hysteresis may be used to avoid or mitigate against continually enabling and disabling receive diversity due to fluctuations in SINR.

Hysteresis may also be implemented in other manners such as in the time domain. For example, receive diversity may be enabled at a particular time (e.g., due to SINR improvement exceeding a threshold value) and may be maintained for at least a certain minimum time period (e.g., even if SINR improvement falls below the threshold value) before receive diversity can be disabled.

The techniques described herein may provide various advantages. First, the techniques may enable receive diversity to be enabled for more operating scenarios that may result in improved performance and lower cost. Second, the techniques may enhance user experience by encouraging receive diversity to be enabled for more operating scenarios, which may improve data transmission performance, conserve battery power, and extend operating life of a wireless device. Third, the techniques may increase throughput, reduce error rate, and improve system capacity by encouraging receive diversity to be enabled for more operating scenarios. The techniques may also provide other advantages.

Figure 7:
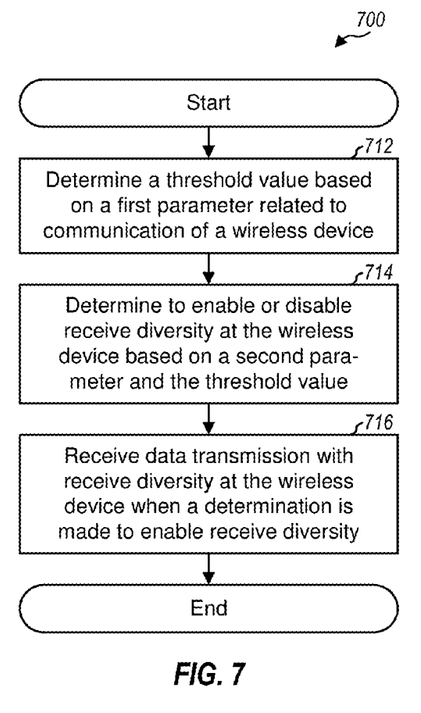
FIGS. 7 and 8 show two exemplary processes for receiving data.

FIG. 7 shows an exemplary process 700 for receiving data. Process 700 may be performed by a wireless device (as described below) or by some other entity. The wireless device may determine a threshold value based on a first parameter related to communication of the wireless device (block 712). The wireless device may determine to enable or disable receive diversity based on a second parameter and the threshold value (block 714). The wireless device may receive data transmission with receive diversity when a determination is made to enable receive diversity (block 716).

In one example, the first parameter may relate to characteristics of data being received by the wireless device. The first parameter may be represented by downlink utilization indicative of an amount of resources used to send data to the wireless device. Resources may be quantified by time, frequency, code, transmit power, etc. The amount of resources used to send data to the wireless device may be quantified by a percentage of time in which data is sent to the wireless device.

In one example, the second parameter may relate to channel conditions observed by the wireless device. The second parameter may be represented by an improvement in received signal quality (e.g. SINR) at the wireless device with receive diversity enabled versus received signal quality at the wireless device with receive diversity disabled.

In one example of block 712, the wireless device may determine the threshold value based on percentage downlink utilization. The threshold value may be indicative of a minimum improvement in received signal quality required to enable receive diversity. The threshold value may increase with lower percentage downlink utilization. Hence, greater improvement in received signal quality may be required to enable receive diversity for lower percentage downlink utilization.

The wireless device may determine the threshold value based on a receive diversity selection function indicative of the minimum improvement in received signal quality required to enable receive diversity versus percentage downlink utilization. In one example, the receive diversity selection function may comprise a 1-level function (e.g., function 510 in FIG. 5). In this case, the wireless device may enable receive diversity if the percentage downlink utilization exceeds a first value and the received signal quality improvement exceeds the threshold value. In another example, the receive diversity selection function may comprise a 2-level function (e.g., function 520 in FIG. 5) defined by two lines of different slopes. In yet another example, the receive diversity selection function may comprise a 3-level function (e.g., function 530 in FIG. 5) defined by three lines of different slopes.

In block 712, the wireless device may determine the threshold value based further on a third parameter related to operation of the wireless device. The third parameter may relate to radio link failure of the wireless device. For example, the wireless device may determine the threshold value based on a first receive diversity selection function if approaching radio link failure is detected. The wireless device may determine the threshold value based on a second receive diversity selection function if approaching radio link failure is not detected.

In block 714, the wireless device may enable receive diversity if the improvement in received signal quality exceeds the threshold value. The wireless device may disable receive diversity if the improvement in received signal quality is below the threshold value.

Figure 8:
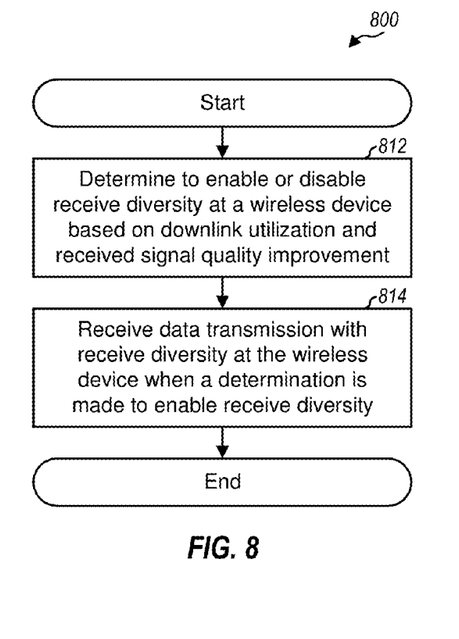

FIG. 8 shows an exemplary process 800 for receiving data. Process 800 may be performed by a wireless device (as described below) or by some other entity. The wireless device may determine to enable or disable receive diversity at a wireless device based on downlink utilization and received signal quality improvement (block 812). The downlink utilization may be indicative of an amount of resources used to send data to the wireless device. The received signal quality improvement may be indicative of improvement in received signal quality at the wireless device with receive diversity enabled versus received signal quality at the wireless device with receive diversity disabled. In general, a greater improvement in received signal quality may be required to enable receive diversity for a lower percentage downlink utilization. The wireless device may also determine to enable or disable receive diversity based further on one or more other parameters such as an indication of radio link failure of the wireless device. The wireless device may receive data transmission with receive diversity when a determination is made to enable receive diversity (block 814).

Figure 9:
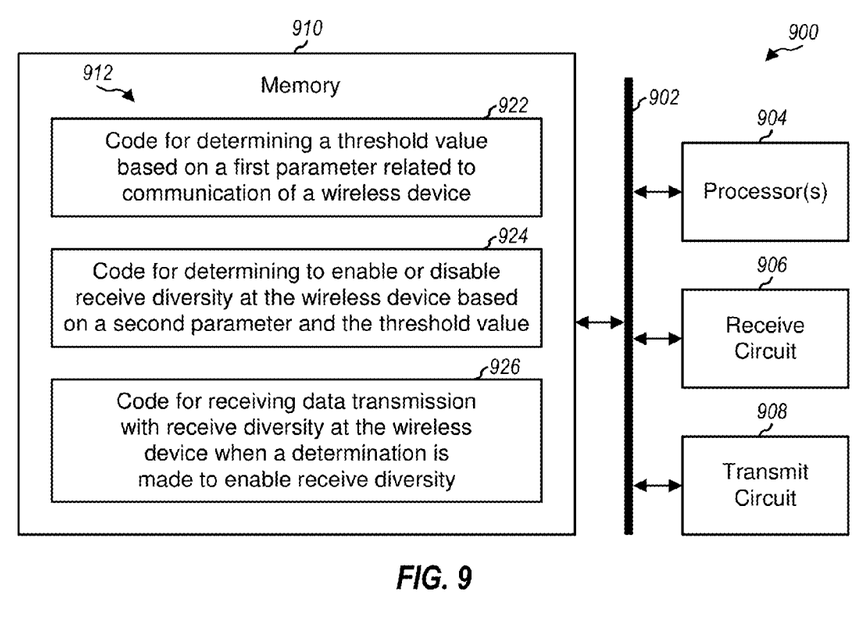
FIG. 9 shows an exemplary implementation of an apparatus.

FIG. 9 shows part of a hardware implementation of an apparatus 900, which may be able to perform process 700 in FIG. 7 and/or process 800 in FIG. 8. Apparatus 900 includes circuitry and may be one configuration of a wireless device (e.g., wireless device 120 in FIG. 1) or some other entity. In this specification and the appended claims, the term "circuitry" is construed as a structural term and not as a functional term. For example, circuitry may be an aggregate of circuit components, such as a multiplicity of integrated circuit components, in the form of processing and/or memory cells, units. blocks and the like, such as shown and described in FIG. 9.

Apparatus 900 comprises a central data bus 902 linking several circuits together. The circuits include at least one processor 904, a receive circuit 906, a transmit circuit 908, and a memory 910. Memory 910 is in electronic communication with processor(s) 904, so that processor(s) 904 may read information from and/or write information to memory 910. Processor(s) 904 may comprise a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. Processor(s) 904 may comprise a combination of processing devices, e.g., a combination of a DSP and a microprocessor, a plurality of microprocessors, one or more microprocessors in conjunction with a DSP core, or any other such configuration.

Receive circuit 906 and transmit circuit 908 may be connected to an RF circuit (not shown in FIG. 9). Receive circuit 906 may process and buffer received signals before sending the signals out to data bus 902. Transmit circuit 908 may process and buffer data from data bus 902 before sending the data out of apparatus 900. Processor(s) 904 may perform the function of data management of data bus 902 and further the function of general data processing, including executing the instructional contents of memory 910. Transmit circuit 908 and receive circuit 906 may be external to processor(s) 904 (as shown in FIG. 9) or may be part of processor(s) 904.

Memory 910 stores a set of instructions 912 executable by processor(s) 904 to implement the methods described herein. To implement process 700 in FIG. 7, instructions 912 may include code 914 for determining a threshold value based on a first parameter related to communication of a wireless device, code 916 for determining to enable or disable receive diversity at the wireless device based on a second parameter and the threshold value, and code 918 for receiving data transmission with receive diversity at the wireless device when a determination is made to enable receive diversity. Instructions 912 may include other codes for other functions, e.g., codes to implement process 800 in FIG. 8. Memory 910 may also store one or more receive diversity selection functions and may be accessed to determine a threshold value to use to enable or disable receive diversity.

Instructions 912 shown in memory 910 may comprise any type of computer-readable statement(s). For example, instructions 912 in memory 910 may refer to one or more programs, routines, sub-routines, modules, functions, procedures. data sets, etc. Instructions 912 may comprise a single computer-readable statement or many computer-readable statements.

Memory 910 may be a RAM (Random Access Memory) circuit. Memory 910 may be tied to another memory circuit (not shown), which may either be of a volatile or a nonvolatile type. As an alternative, memory 910 may be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. Memory 910 may be considered to be an example of a computer-program product that comprises a computer-readable medium with instructions 912 stored therein.

Apparatus 900 may implement wireless device 120 in FIG. 2. For example, processor(s) 904 may implement data processor 240 and controller 280, memory 912 may implement memory 282, and receive circuit 906 may implement receivers 220 and 222. The functional blocks of data processor 240 (e.g., demodulator 250 and 252, decoder 254, and RxD controller 260) may each be implemented in hardware, software, and/or firmware. The software and/or firmware (if any) for each functional block may be stored in memory 912 and executed by processor(s) 904. The hardware (if any) for each functional block may be part of processor(s) 904. For example, metrics computation units 262 and RxD determination unit 264 may be implemented with software and/or firmware, which may be stored in memory 912 and executed by processor(s) 904. The three examples of RxD controller 260, which are shown in FIGS. 3, 4 and 6, may also be implemented in software and/or firmware, which may be stored in memory 912 and executed by processor(s).

FIG. 9 shows an exemplary implementation of an apparatus for a wireless device. The processor(s), memory. and circuits in FIG. 9 may be implemented in various manners. For example, a wireless device may include an ASIC, one or more memories coupled to the ASIC, and one or more RFICs coupled to the ASIC. Processor 904 may be implemented within the ASIC. Memory 910 may be implemented with one or more memories external to the ASIC and/or one or more memories internal to the ASIC. Receive circuit 906 and transmit circuit 908 may be implemented by the RFIC(s). A wireless device may also include different and/or other processors, memories, and circuits not shown in FIG. 9. The processors, memories, and circuits of a wireless device may also be implemented in other manners different from the example described above.

The previous description of the disclosure is presented to enable any person skilled in the art to make and use the disclosure. Details are set forth in the previous description for purpose of explanation. It should be appreciated that one of ordinary skill in the art would realize that the disclosure may be practiced without the use of these specific details. In other instances, well-known structures and processes are not elaborated in order not to obscure the description of the disclosure with unnecessary details. Thus, the present invention is not intended to be limited by the examples and designs described herein, but is to be accorded with the widest scope consistent with the principles and features disclosed herein.

The functions described herein may be implemented in hardware, software, firmware, or any combination thereof. If implemented in software, the functions may be stored as one or more instructions on a computer-readable medium. The term "computer-readable medium" or "computer program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio. and microwave, then the coaxial cable, fiber optic cable, twisted pair. DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the networks, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
    determining a threshold value based on a first parameter related to communication of a wireless device;
    determining to enable or disable receive diversity at the wireless device based on a second parameter and the threshold value; and
    receiving data transmission with receive diversity at the wireless device when a determination is made to enable receive diversity,
    wherein the second parameter is represented by an improvement in received signal quality at the wireless device with receive diversity enabled versus received signal quality at the wireless device with receive diversity disabled, wherein the first parameter is represented by downlink utilization indicative of an amount of resources used to send data to the wireless device.

2. The method of claim 1, wherein the second parameter relates to channel conditions observed by the wireless device.

3. The method of claim 1, wherein the determining a threshold value comprises determining the threshold value based on the downlink utilization.

4. The method of claim 3, wherein the determining to enable or disable receive diversity comprises
    enabling receive diversity if the improvement in received signal quality exceeds the threshold value, and
    disabling receive diversity if the improvement in received signal quality is below the threshold value.

5. The method of claim 3, wherein the determining a threshold value comprises determining the threshold value based on a receive diversity selection function indicative of a minimum improvement in received signal quality to enable receive diversity versus percentage downlink utilization.

6. The method of claim 5, wherein the receive diversity selection function comprises a 1-level function, and wherein receive diversity is enabled if the percentage downlink utilization exceeds a first value and the improvement in received signal quality exceeds the threshold value.

7. The method of claim 5, wherein the receive diversity selection function comprises a 2-level function defined by two lines of different slopes.

8. The method of claim 5, wherein the receive diversity selection function comprises a 3-level function defined by three lines of different slopes.

9. The method of claim 1, wherein the determining a threshold value comprises determining the threshold value based further on a third parameter related to operation of the wireless device.

10. The method of claim 9, wherein the third parameter relates to radio link failure of the wireless device.

11. The method of claim 9, wherein the third parameter relates to radio link failure, and wherein the determining a threshold value comprises
    determining the threshold value based on a first receive diversity selection function if approaching radio link failure is detected, and determining the threshold value based on a second receive diversity selection function if approaching radio link failure is not detected.

12. A method for wireless communication, comprising:
determining to enable or disable receive diversity at a wireless device based on downlink utilization and received signal quality improvement, the downlink utilization being indicative of an amount of resources used to send data to the wireless device, and the received signal quality improvement being indicative of an improvement in received signal quality at the wireless device with receive diversity enabled versus received signal quality at the wireless device with receive diversity disabled; and
receiving data transmission with receive diversity at the wireless device when a determination is made to enable receive diversity.

13. The method of claim 12, wherein a greater improvement in received signal quality is required to enable receive diversity for a lower percentage downlink utilization.

14. The method of claim 12, wherein the determining to enable or disable receive diversity comprises determining to enable or disable receive diversity based further on an indication of radio link failure of the wireless device.

15. An apparatus for wireless communication, comprising:
means for determining a threshold value based on a first parameter related to communication of a wireless device;
means for determining to enable or disable receive diversity at the wireless device based on a second parameter and the threshold value; and
means for receiving data transmission with receive diversity at the wireless device when a determination is made to enable receive diversity,
wherein the second parameter is represented by an improvement in received signal quality at the wireless device with receive diversity enabled versus received signal quality at the wireless device with receive diversity disabled, wherein the first parameter is represented by downlink utilization indicative of an amount of resources used to send data to the wireless device.

16. The apparatus of claim 15, wherein the means for determining a threshold value comprises means for determining the threshold value based on the downlink utilization.

17. The apparatus of claim 16, wherein the means for determining to enable or disable receive diversity comprises
means for enabling receive diversity if the improvement in received signal quality exceeds the threshold value, and
means for disabling receive diversity if the improvement in received signal quality is below the threshold value.

18. The apparatus of claim 16, wherein the means for determining a threshold value comprises means for determining the threshold value based on a receive diversity selection function indicative of a minimum improvement in received signal quality to enable receive diversity versus percentage downlink utilization.

19. The apparatus of claim 15, wherein the means for determining a threshold value comprises means for determining the threshold value based further on an indication of radio link failure of the wireless device.

20. An apparatus for wireless communication, comprising:
circuitry configured to
determine a threshold value based on a first parameter related to communication of a wireless device;
determine to enable or disable receive diversity at the wireless device based on a second parameter and the threshold value; and
receive data transmission with receive diversity at the wireless device when a determination is made to enable receive diversity,
wherein the second parameter is represented by an improvement in received signal quality at the wireless device with receive diversity enabled versus received signal quality at the wireless device with receive diversity disabled, wherein the first parameter is represented by downlink utilization indicative of an amount of resources used to send data to the wireless device.

21. The apparatus of claim 20, wherein the circuitry is configured to determine the threshold value based on the downlink utilization.

22. The apparatus of claim 20, wherein the circuitry is configured to:
enable receive diversity if the improvement in received signal quality exceeds the threshold value; and
disable receive diversity if the improvement in received signal quality is below the threshold value.

23. The apparatus of claim 20, wherein the circuitry is configured to determine the threshold value based on a receive diversity selection function indicative of a minimum improvement in received signal quality to enable receive diversity versus percentage downlink utilization.

24. The apparatus of claim 20, wherein the circuitry is configured to determine the threshold value based further on an indication of radio link failure of the wireless device.

25. A computer program product, comprising:
a non-transitory computer-readable medium comprising:
code for causing at least one computer to determine a threshold value based on a first parameter related to communication of a wireless device;
code for causing the at least one computer to determine to enable or disable receive diversity at the wireless device based on a second parameter and the threshold value; and
code for causing the at least one computer to direct reception of data transmission with receive diversity at the wireless device when a determination is made to enable receive diversity; and
wherein the second parameter is represented by an improvement in received signal quality at the wireless device with receive diversity enabled versus received signal quality at the wireless device with receive diversity disabled, wherein the first parameter is represented by downlink utilization indicative of an amount of resources used to send data to the wireless device.

* * * * *